United States Patent [19]

Muller

[11] Patent Number: 5,174,018
[45] Date of Patent: * Dec. 29, 1992

[54] DIE BUTTON WITH STAKING FEATURES

[75] Inventor: R. M. Muller, Frankfurt, Fed. Rep. of Germany

[73] Assignee: Multifastener Corporation, Detroit, Mich.

[*] Notice: The portion of the term of this patent subsequent to Mar. 8, 2005 has been disclaimed.

[21] Appl. No.: 728,469

[22] Filed: Jul. 11, 1991

Related U.S. Application Data

[60] Division of Ser. No. 485,340, Feb. 26, 1990, Pat. No. 5,067,224, which is a continuation-in-part of Ser. No. 196,209, May 19, 1988, Pat. No. 4,915,558, which is a division of Ser. No. 892,017, Aug. 1, 1986, Pat. No. 4,765,057, which is a division of Ser. No. 773,387, Sep. 6, 1985, Pat. No. 4,633,560, which is a division of Ser. No. 563,833, Dec. 21, 1983, Pat. No. 4,555,838, which is a continuation-in-part of Ser. No. 504,074, Jun. 14, 1983, Pat. No. 4,543,701, and a continuation-in-part of Ser. No. 485,099, Mar. 28, 1983, Pat. No. 4,459,073, Continuation of Ser. No. 229,274, Jan. 21, 1981, abandoned.

[51] Int. Cl.⁵ .................................................. B23P 19/00
[52] U.S. Cl. ........................................ 29/798; 29/432; 29/512; 29/243.517; 72/469
[58] Field of Search .................. 29/798, DIG. 43, 432, 29/432.1, 432.2, 509, 512, 513, 525.2, 243.517; 72/464, 469, 432

[56] References Cited

U.S. PATENT DOCUMENTS

| | | | |
|---|---|---|---|
| 4,064,617 | 12/1977 | Oaks | 29/798 X |
| 4,484,385 | 11/1984 | Woods | 29/798 X |
| 4,490,904 | 1/1985 | Moyher | 29/432 X |
| 4,507,859 | 4/1985 | Shinjo | 29/798 |
| 4,724,610 | 2/1988 | Muller | 29/798 |
| 4,729,163 | 3/1988 | Muller et al. | 72/469 X |
| 5,072,518 | 12/1991 | Scott | 29/798 |

Primary Examiner—Joseph M. Gorski
Assistant Examiner—S. Thomas Hughes
Attorney, Agent, or Firm—Dykema Gossett

[57] ABSTRACT

An improved die member and method of attaching a self-piercing and riveting fastener to a panel wherein a slug pierced from the panel by the riveting fastener is securely staked in the barrel portion of the fastener during the installation of the fastener. The staking method includes driving a plurality of staking projections into said slug, thereby pinching said slug between the projections and a barrel side wall. This pinching action causes the slug to deform outwardly and lodge between the side walls of said fastener. The staking projections are preferably arranged around the perimeter of the die post, and in a most preferred embodiment, the projections have a canted side wall proximal the wall, forcing a portion of said slug toward the barrel side wall, when said slug is pinched between said canted side wall and a bottom wall of said fastener.

15 Claims, 3 Drawing Sheets

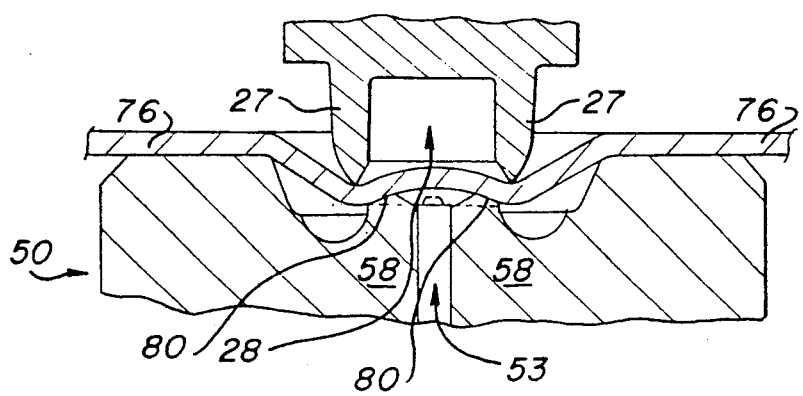
Fig-6
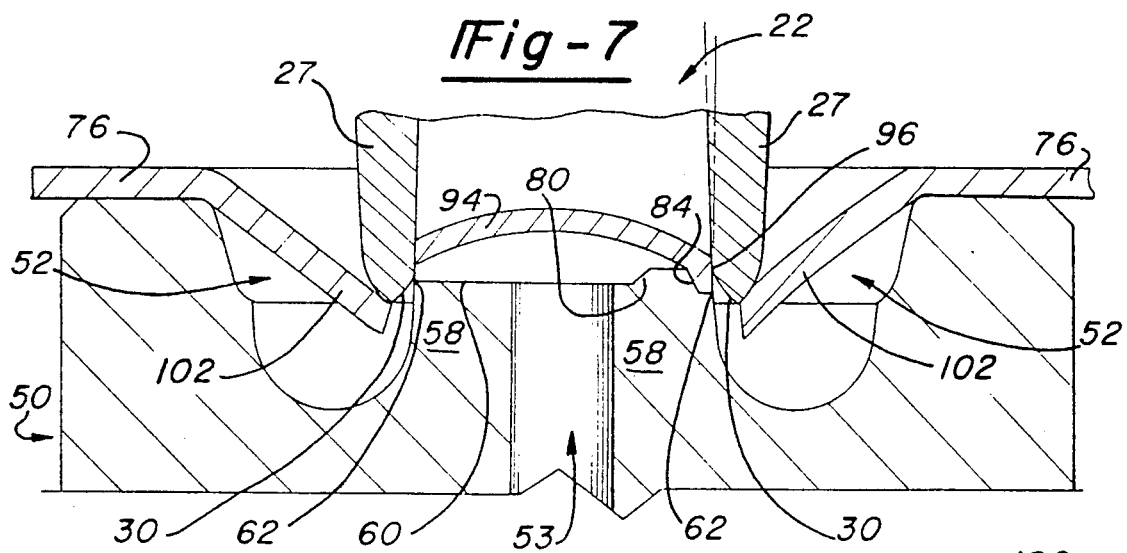
Fig-7
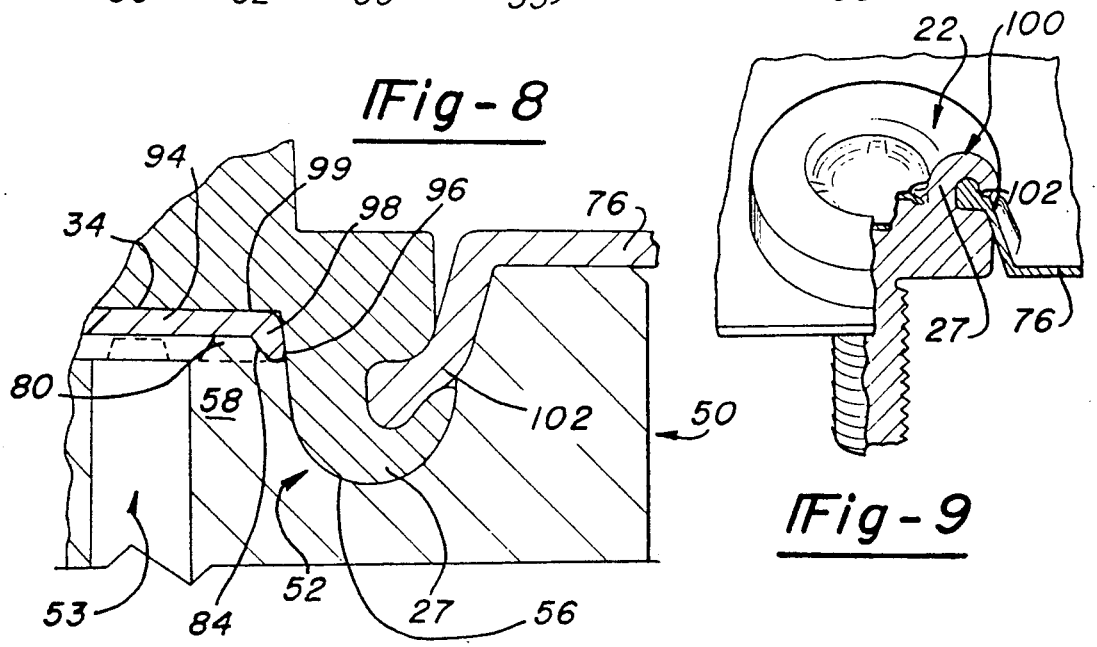
Fig-8
Fig-9

DIE BUTTON WITH STAKING FEATURES

RELATED APPLICATIONS

This application is a divisional of my copending application Ser. No. 07/485,340 filed Feb. 25, 1990, now U.S. Pat. No. 5,067,224, which application is a continuation-in-part application of application Ser. No. 196,209, filed May 19, 1988, now U.S. Pat. No. 4,915,558, which application was a divisional application of Ser. No. 892,017, filed Aug. 1, 1986, now U.S. Pat. No. 4,765,057, which application was a division of Ser. No. 773,387, filed Sept. 6, 1985, now U.S. Pat. No. 4,633,560, which application was a division of Ser. No. 563,833, filed Dec. 21, 1983, now U.S. Pat. No. 4,555,838, which application was a CIP of Ser. No. 504,074, filed Jun. 14, 1983, now U.S. Pat. No. 4,543,701 and Ser. No. 485,099, filed Mar. 28, 1983, now U.S. Pat. No. 4,459,073, which applications were, respectively, continuation and divisional applications of Ser. No. 229,274, filed Jan. 21, 1981, now abandoned, which application claimed priority to my West German application filed Feb. 2, 1980, No. 3,003,908.

Background of the Invention

Self-piercing and riveting fasteners of the type disclosed in U.S. Pat. No. 4,555,838, assigned to the assignee of the present application, are now used in mass production applications, including automotive applications. In such mass production applications, the fasteners are normally installed in a die press capable of generating several tons of die force. The die press may be utilized to simultaneously form the panel into a configured shape, such as an automotive body component or structural support member, and install several riveting fasteners.

One or a plurality of installation heads are installed in one of the die platens of the die press, and the opposite die platen includes aligned riveting die members, commonly referred to as die buttons. The riveting fasteners are fed into the installation heads, generally through plastic tubes or chutes. The installation heads include a feed mechanism, which feeds a fastener to a plunger or punch, reciprocal in the installation head, to install a fastener in a panel located in the die press, with each stroke of the die press.

The self-piercing and riveting fasteners of the type described herein generally include a body portion and an integral tubular or annular barrel portion. In a stud-type fastener of the type disclosed, for example, in the above-referenced U.S. Pat. No. 4,555,838, the body portion of the fastener includes a radial flange integrally joined to the annular barrel portion opposite the free end and a stud portion integrally joined to the flange portion extending in coaxial alignment with the barrel portion. The free end of the tubular barrel portion is comprised of barrel side walls which define an opening into said barrel and a piercing surface adjacent said barrel opening. The opposite end of the barrel portion is closed at the radial fange portion, forming a socket. The die button includes an annular concave die cavity surrounding a central die post. As disclosed, for example, in the above-referenced U.S. Pat. No. 4,555,838 (hereinafter '838), the central die post includes a free end having a peripheral piercing surface and an outer surface which slopes radially outwardly into the annular concave die cavity.

A panel, such as a sheet steel panel or plate used for body panels and structural members by the automotive industry, is secured over the die member, preferably in a die press, as described above. The barrel opening portion is then driven into the panel in coaxial alignment with the central die post of the die button. The die post is configured to be received within the opening of the barrel portion. As the barrel portion is driven into the panel, the piercing surface adjacent the barrel opening pierces a slug from the panel, which is received on the free end of the die post of the die button. The barrel side wall portion is then driven through the opening formed in the panel into the annular die cavity, radially deforming the barrel side walls adjacent said barrel opening, thereby riveting the barrel portion to the panel as described, for example, in the above-referenced U.S. Pat. No. 4,555,838.

When the self-piercing and riveting fastener of the type disclosed in the above-referenced patent was first introduced, several problems were experienced in producing a consistent, high-quality installation. A primary object of this fastening system is to provide a stud or nut-type fastener permanently installed in relatively thin metal panels, such as utilized by the automotive industry, which may have a thickness of 0.030 inches or less. In the most preferred embodiment of the self-piercing and riveting fastener, the tubular barrel portion is deformed radially outwardly in the annular concave die cavity into a U-shaped channel opening toward the body portion of the fastener, and the panel portion surrounding the pierced opening is simultaneously driven into the center of the U-shaped channel and deformed to substantially fill the channel center, forming a very secure mechanical interlock between the fastener and the panel. As the slug is pierced from the panel, the slug is received in the tubular barrel portion and finally driven to the bottom of the tubular barrel portion by the central post of the die button.

It was initially believed that the location of the slug in the tubular barrel portion was essential to prevent inward collapse of the barrel portion whenever the barrel portion underwent outward radial deformation into the preferred U-shaped channel because of resultant inwardly directed forces on the barrel portion as described, for example, in the '838 patent. Although the slug does support the barrel portion during outward radial deformation, it has been found that it is possible to form a secure installation without locating the slug in the barrel portion based upon improvements in the installation, as described below. Nevertheless, the preferred embodiment of the stud-type fastener and panel assembly includes the slug in the barrel portion, particularly in mass production installations, such as automotive applications. This is the case because it is far more convenient to retain the slug in the assembly than to remove and discard the slug through the die button. Further, it may not be possible to remove the slug in certain existing applications because of lack or difficulty of access. In a typical automotive application, studs are attached to automotive structural components or panels in a die press, as described. Further, several studs may be installed simultaneously, and the die press is preferably run continuously during a given production run. Therefore, a substantial volume of panel slugs would have to be removed from the die press area unless the slugs are retained in the assembly.

The initial problem with forming the preferred embodiment of the self-piercing and riveting fastener and panel assembly resulted from tolerance control and friction between the concave annular die cavity surface and the tubular barrel portion during the outward radial deformation of the tubular barrel portion, as described in U.S. Pat. No. 4,825,525, assigned to the assignee of the present application. As described in this patent, the required installation force in a typical application is between about 10 and 20 tons. Particularly in mass production applications, orientation of the fasteners and the die member and very close tolerances are critical to achieving a good installation integrity. The installation force, which is composed of the forces required for piercing, forming of the barrel, and setting of the panel, results in very significant friction between the barrel portion of the fastener and the die cavity. The pressure between the barrel walls and the die cavity may exceed 50 tons per square inch. The frictional forces generated by this pressure sometimes resulted in collapse of the barrel portion or stud, poor or incomplete installations and stress risers or faults, all of which significantly reduced the integrity of the joint assembly. These problems were, however, overcome by coating at least the internal surface of the barrel portion with a friction-resistant coating, preferably a fluorocarbon coating, such as an air-drying polytetrafluoroethylene lubricant, suspended in a fast-drying thermoplastic resin as disclosed in U.S. Pat. No. 4,825,525.

Substantial improvements in manufacturing tolerances and the use of a friction-resistant coating has resulted in more consistent installations, including an excellent mechanical interlock between the fastener barrel portion and the panel. In fact, in many applications, the pull-out strength of a typical stud fastener as disclosed in the above-referenced U.S. patents may be greater than the tensile strength of the stud. These improvements have, however, brought about another problem, namely, the inability to retain the panel slug in the barrel portion. When utilizing the above-mentioned improvements, the panel slug may drop out of the barrel portion as the die press is opened or while assembling a structural element to the panel on which the stud fastener is attached. In cases where the slug is released during installation of the stud-type fastener, the slug may remain on the center post of the female die member. When a subsequent stud is then installed in a new panel, a slug is pierced from the panel and received over the die button center post, over the first slug. This results in damage to the installation head or die button, and deformation of the flange portion of the second stud, which may actually be sheared from the fastener by the installation plunger. Thus, it is very important to securely retain the panel slug in the barrel portion of the stud-type fastener during installation. The problem of retaining the slug in the barrel portion is particularly difficult where the panel is relatively thin, such as automotive applications where the panel metal may be less than 0.040 inches or less.

The problem of slug retention has been solved by the method of attaching a self-piercing and riveting fastener of this invention and the improved die button by securely staking the panel slug in the barrel portion. As will be understood, the slug must be retained in the barrel portion during installation, avoiding the necessity of a separate step. The method of this invention and the improved die button stakes the slug in the barrel portion during installation of the fastener in the panel, thus eliminating a separate step.

SUMMARY OF THE INVENTION

The method of attaching a self-piercing and riveting fastener of this invention includes staking the panel slug in the barrel portion during the installation step. As described, the fastener includes an annular barrel portion having barrel side walls which define an opening into said barrel and a piercing surface adjacent said opening. The method includes driving the fastener barrel piercing surface against the panel, piercing a slug from the panel, and forming a panel opening. The barrel side walls are then driven through the panel opening and are preferably deformed radially outwardly, riveting the barrel portion to the panel. The panel slug is simultaneously driven into the barrel portion through the opening, and in the most preferred embodiment staking the slug against the barrel side walls, thereby lodging said slug within said barrel. The most preferred method of this invention includes driving a plurality of circumferentially spaced staking projections into said slug, thereby forcing said slug up against a bottom wall of said barrel, thereby causing a portion of said slug to deform outwardly and wedge against said barrel side walls.

The improved die member or die button of this invention includes a plurality of spaced staking projections on the die post. As described in the above-referenced U.S. patent, the preferred die button includes an annular concave die cavity surrounding a projecting central die post. The central die post has a free end which receives the panel slug and an outer piercing surface configured to be received in the barrel opening. The outer surface of the central die post traverses radially outwardly into the die cavity to receive the inner surface of the barrel portion. The die cavity promotes the radial outward deformation of said barrel side walls, which is completed in the annular concave die cavity.

In the most preferred embodiment of the die button, the free end of the die post includes a plurality of staking projections which are circumferentially spaced about the free end of the central die post. Each staking projection preferably includes a first and second canted side wall and a top wall. The first canted side wall is preferably proximal to the barrel side wall and sloped such that it drives a portion of the slug against the barrel side wall when the die post is driven into the barrel opening. The second canted side wall of the staking projections is preferably proximal the center of the die post free end.

The most preferred method of this invention includes outwardly deforming the slug periphery by pinching it between the staking projection and the bottom wall of the barrel. When the slug is outwardly deformed, it lodges against the barrel walls, thereby staking the slug between the barrel walls, forming a very secure interlock between the barrel portion and the panel slug, preventing inadvertent removal of the panel slug.

The method and improved die button of this invention therefore elminate the problem of inadvertent removal of the panel slug, including installations in relatively thin panels. The panel slug is automatically staked in the barrel portion during installation, eliminating the requirement for a separate step. The staking of the panel slug in the barrel portion is performed by the die button, without any substantial increase in cost and without materially affecting the strength of the die button or the integrity of the fastener and panel assembly. Other advantages and meritorious features of the present invention will be more fully understood from the description of the preferred embodiments, the appended claims and the drawings, a brief description of which follows.

BRIEF DESCRIPTION OF THE DRAWINGS

FIGS. 6–8 are cross-sectional side views illustrating the sequence of installation of the self-piercing and riveting fastener in a panel with the improved die button shown in FIGS. 2–5;

FIG. 9 is a partial cross-sectional view of the final fastener and panel assembly.

DETAILED DESCRIPTION OF THE PREFERRED EMBODIMENTS OF THE INVENTION

Figure 1:
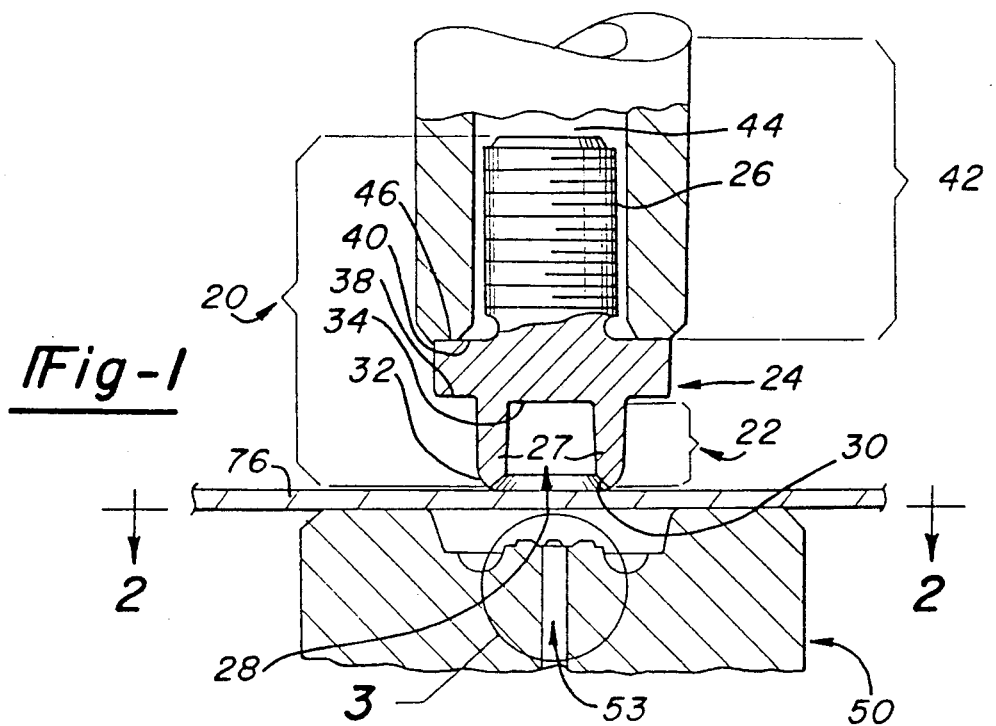
FIG. 1 is a side partially cross-sectioned view of a self-piercing and riveting fastener prior to installation and die member.
Figure 2:
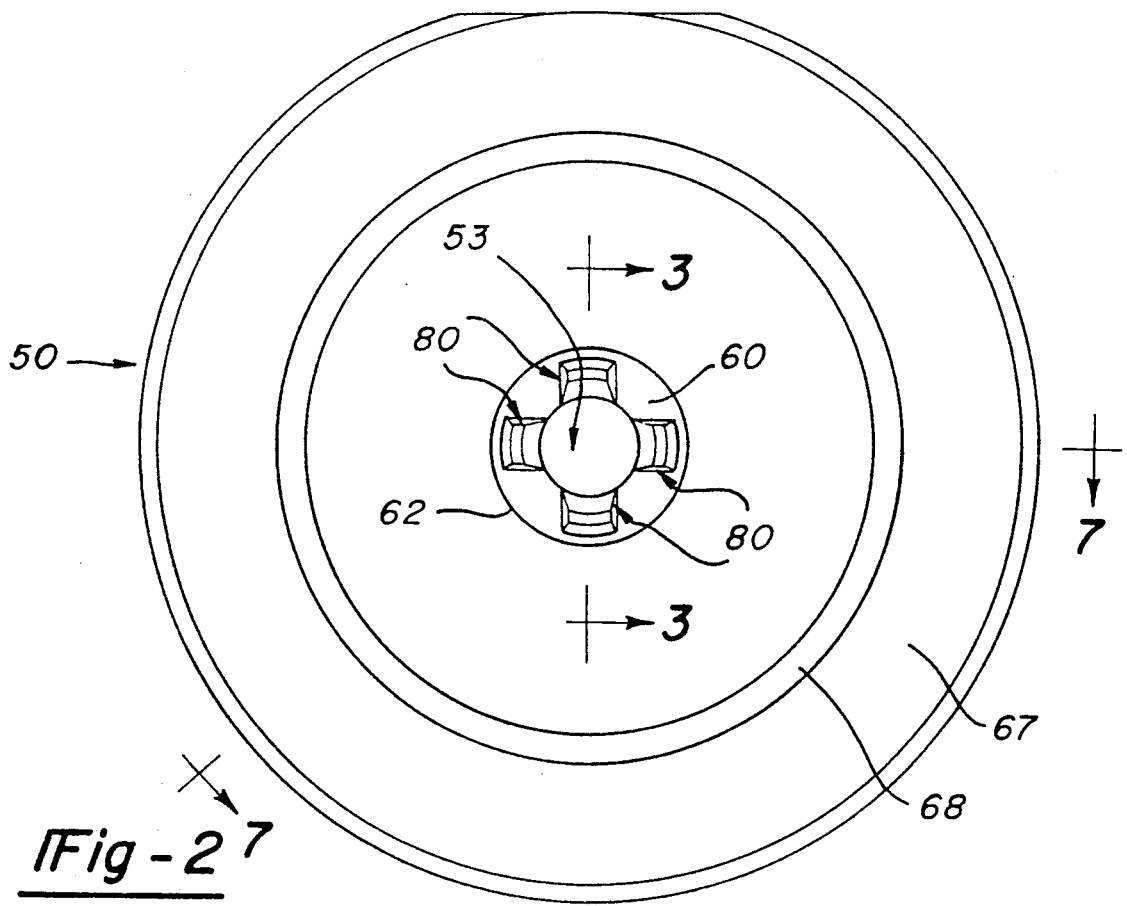
FIG. 2 is a top view of one embodiment of the improved die member of this invention in the direction of view arrows 2—2 in FIG. 1.

As described above, the disclosed self-piercing and riveting fastener and the improved die member of this invention is particularly adapted for mass production applications, including automotive applications. The self-piercing and riveting fastener 20 illustrated in the drawings is a stud fastener of the type disclosed in U.S. Pat. No. 4,555,838; however, the improved method of attaching a self-piercing and riveting fastener and improved female die member of this invention is not limited to the configuration of the fastener. Further, the use of the term "fastener" is not intended to be limited to a fastening element which is adapted for attaching the panel to a structural element by a female fastener or the like.

The self-piercing and riveting fastener utilized in the method of this invention is intended for permanent attachment to a plate or panel, particularly a metal sheet or the like, such as utilized by the automotive industry for body panels and component parts. As described in the above-referenced patents, the self-piercing and riveting fastener disclosed herein is particularly suitable for installation in a conventional die press, such as utilized by the automotive industry to form sheet metal parts, including body panels and structural components. In such applications, the press installs one or more fastening elements with each stroke of the press, wherein the fastener element becomes a permanent part of the panel. As used herein, "panel" refers to any plate, panel or metal sheet having a thickness thin enough to permit piercing of the panel with the fastening element as described herein. The self-piercing and riveting fastener may also be utilized in any application where rivets are presently used, such as securing panels together and closures. The method and improved die member or button of this invention is particularly adapted for retaining the panel slug pierced from the panel by the self-piercing and riveting fastener in the barrel portion of the fastener, as now described.

Now referring to FIG. 1, the disclosed embodiment of the self-piercing and riveting fastener 20 includes a barrel portion 22 and a body portion including a radial flange portion 24 and a stud portion 26. In the disclosed embodiment, the stud portion 26 is externally threaded; however, the stud portion may be smooth or any other configuration, including the stud portion of a ball joint or an internally threaded cavity functioning as a nut.

The barrel portion 22 includes barrel walls 27 which define opening 28. Barrel walls 27 adjacent opening 28 have a chamfered piercing surface 30 and an arcuate annular outer surface 32. As described in the above-referenced U.S. Pat. No. 4,555,838, the frusto-conical piercing surface 30 in combination with the arcuate annular surface 32 provides important advantages in a self-piercing and riveting fastener of the type disclosed herein. However, the method and improved die member of this invention are not limited to the configuration of the free end of the barrel portion. In the disclosed embodiment, the flange portion 24 bridges the barrel portion providing a bottom wall 34 which may be flat (as shown) or concave (not shown). The combination of bottom wall 34 and barrel walls 27 form an open-ended socket within barrel 22. Further, the flange portion 24 includes a radial annular surface 38 adjacent the barrel portion 22, sometimes referred to as the pressing surface, and a radial annular surface 40 adjacent the stud portion 26, sometimes referred to as the driven surface.

Where the self-piercing and riveting fasteners 20 are installed by a die press, as described above, the fasteners are normally fed to an installation head (not shown) which is attached to one platen of the die press. The installation head includes a plunger 42 which in the disclosed embodiment includes an axial bore 44 which receives the stud portion 26 of the fastener. The plunger includes an annular driving surface 46 which is driven against the annular driven surface 40 of the flange portion 24 of the fastener. A die member or die button 50 is normally attached in the opposite die platen in coaxial alignment with the plunger 42. U.S. Pat. No. 4,555,838 includes further disclosures of suitable embodiments of installation heads adapted for installing self-piercing and riveting fasteners of the type described herein. For the purposes of this disclosure, however, it is sufficient to state that the plunger 42 is driven toward die member 50 with sufficient force to install the fastener 20 in panel 76 supported on die member 50, as described below.

Details of the improved die member or die button 50 are best shown in FIGS. 2 to 5. As shown, the die member includes a die cavity 52, including an annular concave die surface 56 surrounding a center die post 58. The die post 58 includes a free end 60 having a piercing surface 62 at its outer peripheral edge. As shown, the piercing surface 62 is relatively sharp to cooperate with the frusto-conical piercing surface 30 of the barrel portion 22 to pierce a panel. Other configurations of piercing surface may, however, be used. In the disclosed embodiment, the piercing surface 64 of the center post 58 tapers conically and radially outwardly at an angle of about 7 degrees 66 until it blends into the arcuate concave surface 56 of the annular die cavity. As will be understood by those skilled in the art, the surface of the annular arcuate concave die cavity 56 is preferably smooth and polished to control the radial outward deformation of the barrel portion as described below. The die button 50 further includes an annular bearing surface 67 which surrounds the die cavity 52, and the die cavity 52 includes an inwardly tapered die surface 68 which receives and supports the panel 76 during deformation of the panel as described below. The panel 76 is supported on the annular bearing surface 68 during installation of the self-piercing and riveting fastener 20. In actual operation, the panel should be securely clamped to prevent relative movement of the panel 76 and the die member 50.

The preferred embodiment of the die member of this invention includes a plurality of staking projections 80 which preferably extend above the free end 60 of the center post 58. Each staking projection includes a top surface 82 which intersects a first canted surface 84 and a second canted surface 86. In a preferred embodiment, first canted surface 84 is sloped so that (during use) it partially faces fastener barrel walls 27 and partially faces fastener bottom wall 34. The purpose for the preferred slope of the first canted surface 84 will be discussed in detail in conjunction with FIGS. 6-9. Staking projections 80 preferably have a third side 88 and a fourth side 90. The third side 88 and fourth side 90 preferably are tapered inwardly 92 to accomodate easy separation from the slug (not shown).

Figure 3:
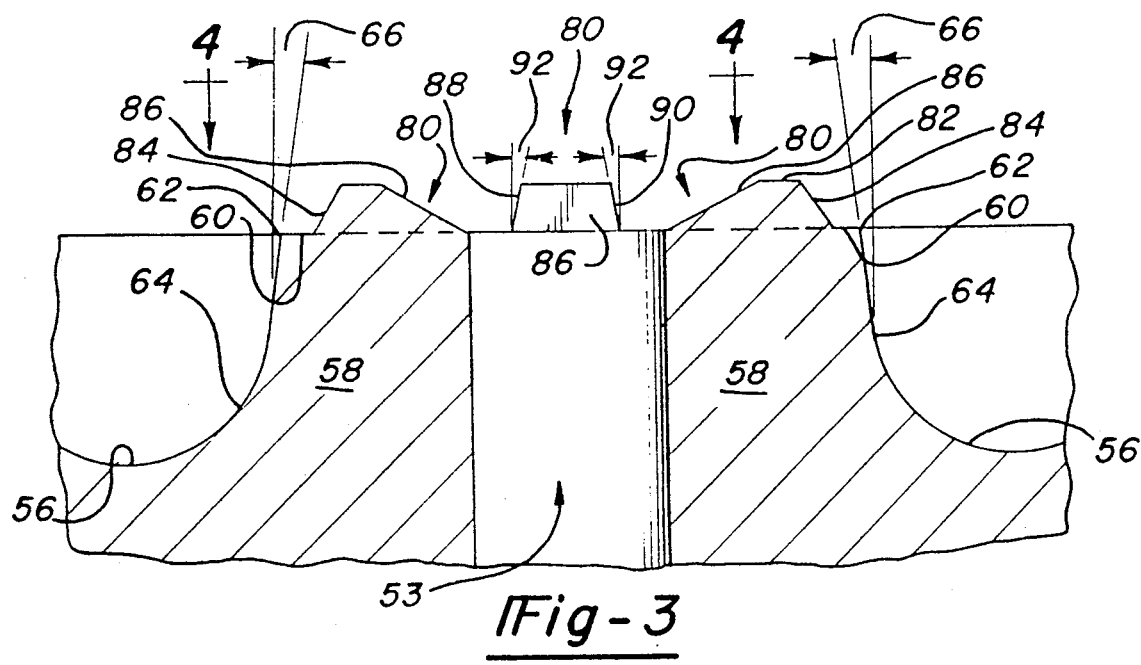
FIG. 3 is a cross-sectioned side view of the die member shown in FIG. 1 in the direction of view arrows 3—3 in FIG. 2.
Figure 4:
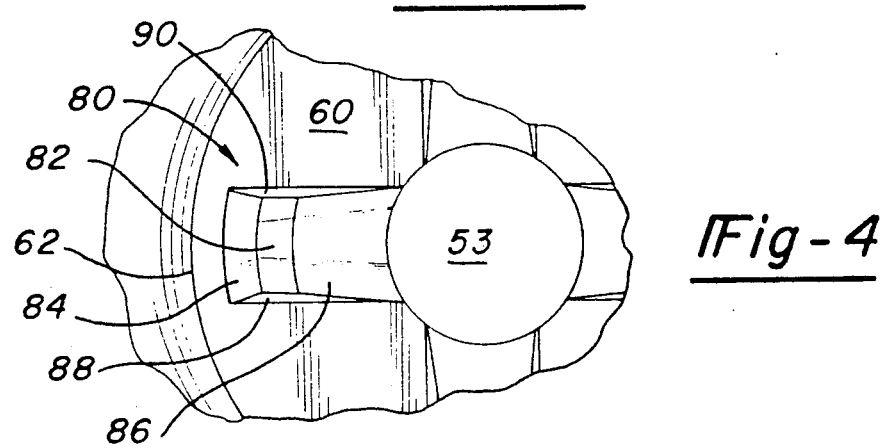
FIG. 4 is a top view taken substantially along lines 4—4 of FIG. 3.
Figure 5:
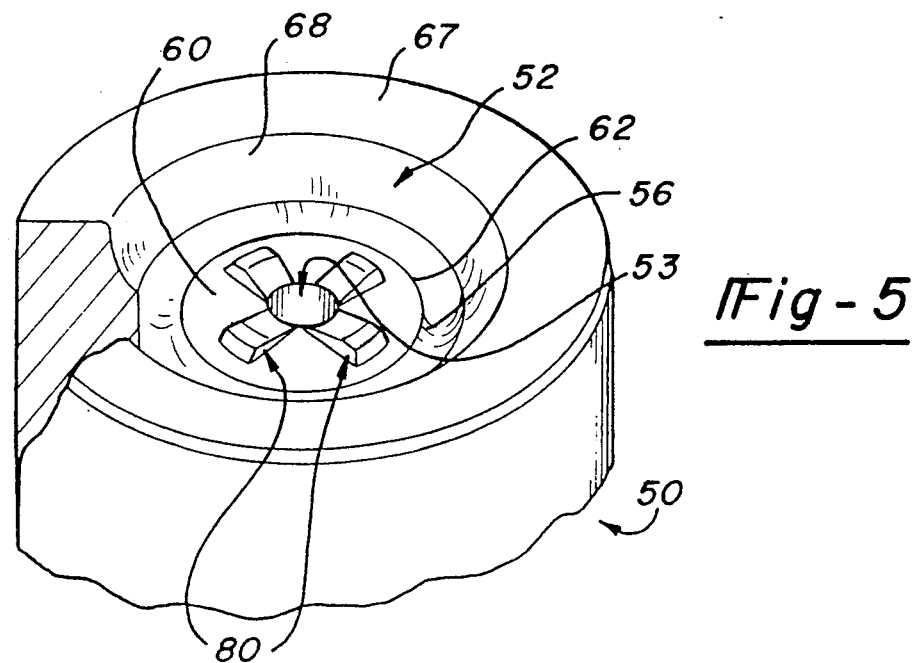
FIG. 5 is an isometric view of the die member of FIG. 2.

In the preferred embodiment, the plurality of staking projections 80 are symmetrically distributed on the die post free end 60 proximate its circumference. This distribution preferably includes arranging the plurality of staking projections 80 in a circle, as depicted in FIG. 5. It is important to note that although the staking projections 80 are shown as discrete entities, it is within the scope of this invention to comprise staking projections 80 from a single continuous ringed surface rising up from die post free end 60. A cross-section of this ringed surface would be identical to the cross-section of the plurality of staking projections as shown in FIG. 3. Die member 50 preferably has a central bore 53 which provides an air release passage for any air which may be trapped within die cavity 52 during the course of the fastening process.

FIGS. 6-8 illustrate the preferred sequence of installation of a self-piercing and riveting fastener and the method of staking the panel slug in the barrel portion of this invention. As shown in FIG. 6, barrel side walls 27 are driven into panel 76, and panel 76 is thus driven against staking projections 80 of die post 58. Central bore 53 channels air away from die cavity 52 which would otherwise be entrapped during the fastening procedure.

Now referring to FIG. 7, barrel walls 27 are further driven into panel 76, and die piercing surfaces 62 and barrel piercing portion 30, respectively, pierce slug 94 from panel 76. Slug 94 will generally assume a concave position because of the shearing forces it experiences along its peripheral edges. The portions of slug 94 which lay adjacent first canted surface 84 of staking projections 80 undergo an outward deformation as they are compressed between first canted surface 84 and barrel wall surface 96. A slug 94 is thus pierced from the panel in substantially one step, resulting in a generally circular slug 94. It will be understood, however, that the configuration of the slug will be dependent upon the shape of the tubular barrel portion 22 which need not be circular. For example, the tubular barrel portion 22 could be polygonal, wherein the die post 58 and die cavity 52 would be polygonal and configured to receive the barrel portion.

As barrel walls 27 are driven into die cavity 52, portion 102 of the panel 76 adjacent the pierced panel opening is simultaneously driven into the die cavity 52, and the panel slug 94, which is received on staking projections 80 and die post free end 60, is driven into the barrel portion 22. As will be understood by those skilled in the art, the diameter of the panel slug 94 is substantially equal to or slightly greater than the internal diameter of the barrel portion 22. However, because staking projections 80 cause a slight deformation in slug 94 (during the period slug 94 is sheared from panel 76), the edges of slug 94 which are proximate first canted surface 84 are deformed against the internal surface of barrel walls 27.

Now referring to FIG. 8 of the drawings, as the fastener barrel walls 27 are driven into die cavity 52, they are received against concave annular die surface 56 of die cavity 52 and are deformed radially outwardly. Simultaneous with this radially deforming action, staking projections 80 drive slug 94 against barrel bottom wall 34. Once slug 94 is seated against barrel bottom wall 34, staking projections 80 begin to pinch slug peripheral portions 98 against barrel bottom wall at point 99, thereby causing periphery portions 98 to deform against wall 27 at surface 96. First canted surface 84 aids in directing slug peripheral portions 98 toward barrel wall surface 96 by virtue of its angular orientation. As staking projections 80 are driven into slug 94, first canted surface 84 is sloped to direct slug peripheral portions 98 toward barrel wall surface 96, thereby frictionally lodging slug 94 within barrel 22 and against bottom wall 34.

Now referring to the drawing of FIG. 9, the radial deformation of barrel side walls 27 forms a U-shaped channel 100. This channel 100 grips panel portion 102, thereby forming a secure mechanical interlock between barrel portion 22 and panel portion 102.

Thus, it is seen that panel slug 94 is staked within barrel 22 simultaneously with fastening barrel side walls 27 to panel portion 102.

Having described the preferred method of attaching a self-piercing and riveting fastener and the improved die button of this invention, it will be understood that various modifications may be made within the purview of the appended claims. The dimensions of the self-piercing and riveting fasteners will depend upon the particular application and panel thickness. As described above, however, the method and improved die button of this invention is particularly suitable for permanent attachment of self-piercing and riveting fasteners to relatively thin panels, such as utilized for body and structural components in the automotive and appliance industries. As will be understood, the self-piercing and riveting fastener disclosed herein is preferably formed of a deformable metal, preferably steel, which may be heat-treated for surface hardness, ductility, etc. A suitable material for the self-piercing and riveting fasteners disclosed herein is typically medium carbon steels, including SAE 1022, 1023 and 1030 steels. Reference may also be made to the above-referenced U.S. patents for further information regarding suitable installation apparatus, self-piercing and riveting fasteners and methods of installation.

We claim:

1. A die member for attaching self-piercing and riveting fasteners to a panel, said fasteners each including an annular barrel portion having barrel side walls which define an opening into said barrel, a bottom wall joining said side walls opposite said opening and a piercing surface adjacent said barrel opening, said die member having an annular concave die cavity surrounding a projecting central die post, said die post configured to receive said fastener annular barrel portion, said annular concave die cavity having a generally smooth annular concave surface and said central die post having a free end including an outer peripheral piercing surface configured to be received in said barrel opening, said die post piercing surface cooperating with said piercing surface of said barrel portion to pierce said panel, said die post having a plurality of spaced staking projections placed radially inwardly from said piercing surface of said die post, said spaced staking projections each adapted to deform a portion of said slug, thereby urging said slug portion against said barrel walls causing said slug to be retained in said barrel portion of said fastener.

2. The die member for attaching a self-piercing and riveting fastener to a panel as defined in claim 1, characterized in that said plurality of staking projections are circumferentially spaced about said free end of said central die post and wherein each said staking projection includes a first and second canted side wall and a top wall joining said first and second canted side walls.

3. The die member for attaching a self-piercing and riveting fastener to a panel as defined in claim 2, characterized in that said canted side walls of each projection are arranged wherein said first canted side wall is proximal said barrel side wall and said second canted side wall is distal said barrel side wall.

4. The die member for attaching a self-piercing and riveting fastener to a panel as defined in claim 3, characterized in that said proximal canted side wall of each said projection is generally planar and sloped such that it drives said slug against said barrel bottom and proximal side wall when said die is forced through said panel and into said fastener barrel.

5. The die member for attaching a self-piercing and riveting fastener to a panel as defined in claim 3, characterized in that said distal and proximal side wall of each projection are substantially planar and each have opposite slopes.

6. The die member for attaching a self-piercing and riveting fastener to a panel as defined in claim 5, characterized in that each said projection's top wall is substantially planar and wherein said free end of said die post is substantially planar and said top wall of each said projection is substantially parallel to said die post.

7. A die member for attaching self-piercing and riveting fasteners to a panel, said fasteners each including an annular barrel portion having barrel side walls which define an opening into said barrel, a bottom wall joining said side walls opposite said opening and a piercing surface adjacent said barrel opening, said die member having an annular concave die cavity configured to receive said fastener annular barrel portion surrounding a projecting central die post, said annular die cavity having a generally smooth annular concave surface, said die post having a free end having internal walls defining a central bore for routing trapped air, and a generally planar top surface which is bounded by a piercing surface, said top surface and said piercing surface adapted to be received in said barrel opening, said die post top surface including a plurality of circumferentially spaced staking projections extending out from said die post surface, said projections spaced radially inwardly from said piercing surface, wherein each one of said plurality of staking projections includes first and second canted side walls and a top wall, said piercing surface of said die post cooperating to pierce a slug from said panel, said die post then driving said panel slug into said barrel opening and against said barrel bottom wall, said projections penetrating into said slug and causing a portion of said slug to outwardly deform, thereby lodging said slug within said barrel.

8. The die member for attaching a self-piercing and riveting fastener to a panel as defined in claim 7, wherein said first canted side wall of each projection is proximal said barrel side wall and said second canted side wall is proximal said central bore, and wherein said first and second canted side walls are generally planar and of opposite slopes.

9. The die member for attaching a self-piercing and riveting fastener to a panel as defined in claim 8, wherein said first canted side wall is sloped so that it partially faces said barrel bottom and said proximal side wall, and wherein said top wall of each said projection is substantially planar and joins said first and second canted side walls and wherein said free end of said die post is substantially planar and said top wall of each one of said projections is substantially parallel to said die post planar surface.

10. A die for attaching self-piercing and riveting fasteners to a panel, said fasteners of the type including an annular barrel portion having barrel side walls which define an opening into said barrel, said barrel side walls adjacent said opening defining a piercing surface, said barrel portion further including a bottom wall joining said barrel side walls opposite said opening, said die comprising:
 a projecting central die post surrounded by an annular concave die cavity, said die post adapted to receive said fastener annular barrel portion, said annular concave die cavity having a generally smooth annular concave surface and said central die post having a free end including a piercing surface adapted to be received in said barrel opening, said die post further including a plurality of spaced staking projections,
 whereby when said panel is placed between said fastener and said die, and when said fastener and said die are brought together, said die post piercing surface cooperates with said fastener piercing surface to pierce a slug from said panel, whereby said spaced staking projections each deform a portion of said slug, thereby urging said slug against said barrel walls causing said slug to be retained in said barrel portion of said fastener.

11. The die for attaching self-piercing and riveting fasteners to a panel as defined in claim 10, wherein said plurality of staking projections are circumferentially spaced about said free end of said central die post and wherein each said staking projection includes a first and second canted side wall and a top wall joining said first and second canted side walls.

12. The die for attaching self-piercing and riveting fasteners to a panel as defined in claim 11, wherein said first canted side wall is proximal said barrel side wall and said second canted side wall is distal said barrel side wall.

13. The die for attaching self-piercing and riveting fasteners to a panel as defined in claim 12, wherein said proximal canted side wall of each said projection is generally planar and sloped such that it drives said slug against said barrel bottom wall and proximal side wall when said die is forced through said panel and into said fastener barrel.

14. The die for attaching self-piercing and riveting fasteners to a panel as defined in claim 12, wherein said distal and proximal side wall of each projection are substantially planar and each have slopes of opposite polarity.

15. The die for attaching self-piercing and riveting fasteners to a panel as defined in claim 14, wherein the top wall of each projection is substantially planar and wherein said free end of said die post is substantially planar and said top wall of each said projection is substantially parallel to said die post.

* * * * *